F. G. BREYER.
CONTINUOUS GAS CALORIMETER.
APPLICATION FILED MAR. 31, 1915.
1,205,704.
Patented Nov. 21, 1916.
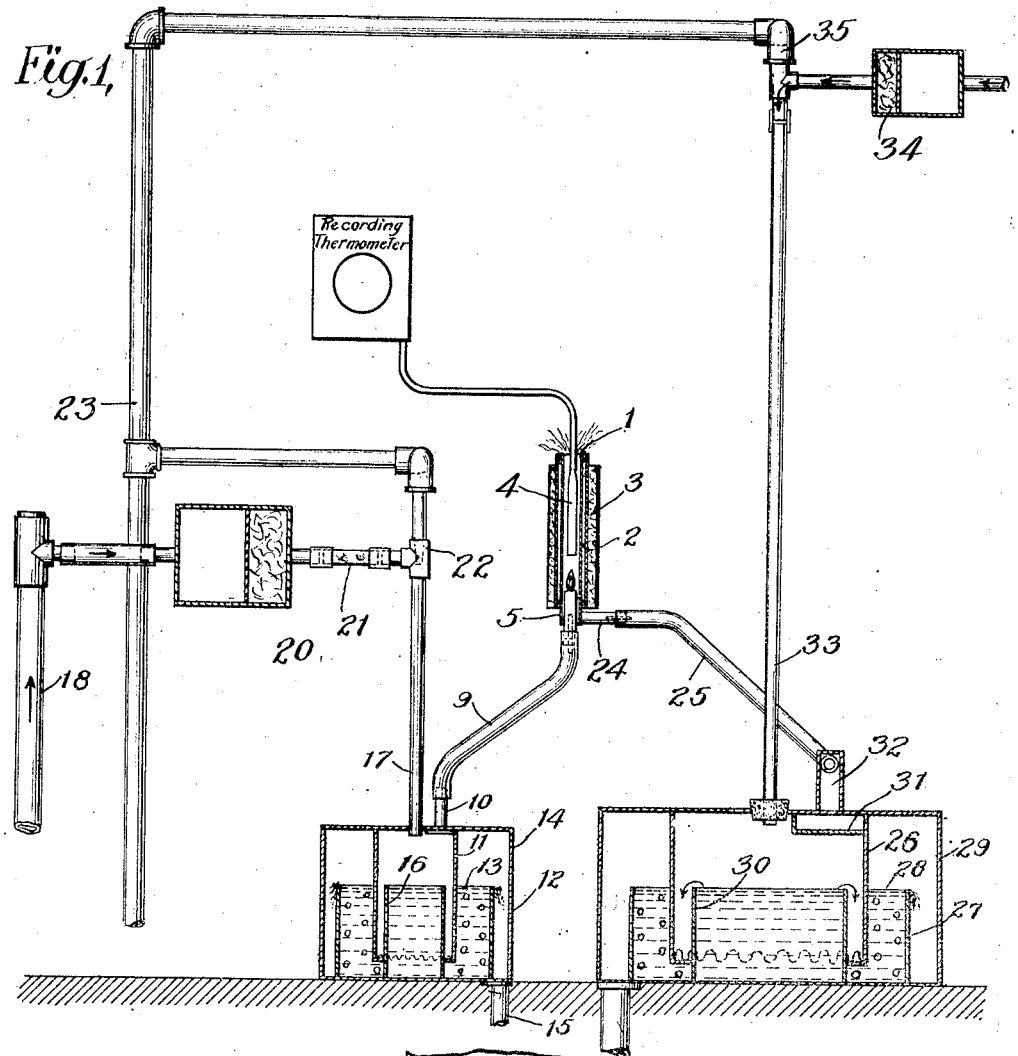
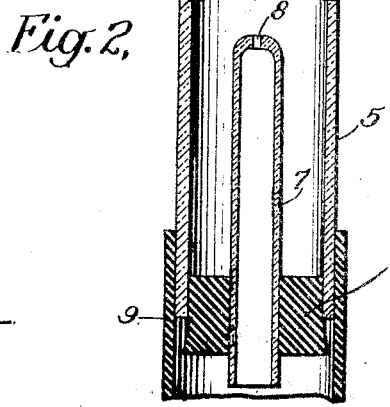
WITNESSES
L. Bates
R. S. Schiff
INVENTOR
Frank G. Breyer
BY
Pennie Davis & Marvin
ATTORNEYS

UNITED STATES PATENT OFFICE.

FRANK GOTTLOB BREYER, OF PALMERTON, PENNSYLVANIA, ASSIGNOR TO THE NEW JERSEY ZINC COMPANY, OF NEW YORK, N. Y., A CORPORATION OF NEW JERSEY.

CONTINUOUS GAS-CALORIMETER.

1,205,704.  Specification of Letters Patent.  Patented Nov. 21, 1916.

Application filed March 31, 1915. Serial No. 18,247.

*To all whom it may concern:*

Be it known that I, FRANK G. BREYER, a citizen of the United States, residing in Palmerton, county of Carbon, and State of Pennsylvania, have invented certain new and useful Improvements in Continuous Gas-Calorimeters; and I do hereby declare the following to be a full, clear, and exact description of the invention, such as will enable others skilled in the art to which it appertains to make and use the same.

In the manufacture or use of combustible gases, when operating on a large scale, it is often necessary to know the calorific value of the gas from time to time so that necessary corrections may be made in the process of manufacture or in the rate at which the gas is being supplied to furnaces or other apparatus. This is particularly the case with producer gases, which are liable to quick and very pronounced changes in composition, and is of importance when those gases are supplied to spelter furnaces, because of the variations in temperature which would result if changes were not made to compensate for the changes in calorific value.

Tests of the calorific value may be made by taking samples from the gas main from time to time and analyzing these samples according to standard methods of gas analyses, but this mode of procedure is expensive and troublesome, and the results are attained only after some delay, so that there is need for a practical and trustworthy calorimeter which will give at any instant a correct indication of the calorific value of the gas then being supplied, and which, preferably, will record that calorific value as a diagram for future reference.

It is the object of the present invention to provide an accurate and not too costly apparatus for continuously indicating or recording the calorific value of any gas which, upon being ignited, will burn and thereby generate heat. To attain this object, I provide a combustion chamber wherein the gas under test may be ignited in an excess of air, and I provide means for supplying the gas and air to the combustion chamber in volumes having a constant ratio one to another, so that with constant calorific value for the gas the temperature of the combustion chamber will remain constant, but when the calorific value changes, the combustion chamber will become hotter or cooler in accordance with the calorific change. A thermometer is provided for indicating and preferably for recording the temperature of the combustion chamber, and by calibrating the apparatus on a gas of known calorific value, the apparatus may be standardized for gases of unknown composition, and the thermometer record will indicate not only their true calorific value, but will indicate and record almost instantly any variations in that calorific value due to variations at the source or place of manufacture.

As a means for maintaining a constant ratio between the volumes of gas and air supplied to the combustion chamber, I make use of supply apparatus of novel construction. Irrespective of changes in barometric pressure I maintain a constant ratio between the number of standard gas units and the number of standard absorbing units supplied to the combustion chamber where the gas is continuously combusted, so that the rise in temperature of the absorbing material, *i. e.*, the air, may be taken as an indication or record of the calorific value of the gas. The details of this supply means and the advantages and mode of operation thereof, will be made clear by the following detailed description, which is to be taken in conjunction with the accompanying drawings, wherein, Figure 1 is an elevation of my complete apparatus, somewhat diagrammatic in character, but illustrating the relation of the several elements; and Fig. 2 is an enlarged detail of the gas baffle located just back of the gas flame in the combustion chamber.

In the drawings, the combustion chamber comprises a cylinder 1 surrounded by a dead air space 2 outside of which is a lagging 3 of mineral wool, or the like, serving to thermally insulate the wall of the combustion chamber. Projecting into this combustion chamber, or otherwise exposed to the heat thereof, is the sensitive element or bulb 4 of a thermometer, preferably of the indicating and recording type, such as Bristol recording thermometers.

The combustion chamber preferably extends vertically with its top opening freely into the atmosphere, so that the gaseous pressure within the combination chamber may at all times be substantially that of the atmosphere. Through the bottom of the combustion chamber extends a burner tube 5 which may be of glass, and at the top of which the gas under test is burned. The lower end of this burner tube 5 is provided with a rubber cork 6 through which projects a glass tube 7 having a small, smooth orifice 8 at its upper end, serviceable to accurately fix the rate at which gas under constant pressure can flow through to the burner end. This tube 7, therefore, serves as a baffle to accurately control the volume of gas burning during any time interval, and by making it of glass, the orifice 8 can be made smooth and will not corrode or wear away, and can be changed in dimensions, should occasion require, by simple glass blowing methods. Leading to the burner tube 5 is a rubber pipe 9 connected with the outlet 10 of the gas supply tank, the details of which will now be described.

The gas supply tank comprises a cylindrical stationary bell 11 surrounded at its lower open end by a water tank 12 spaced therefrom to form an annular chamber into which water may be introduced to form a water seal 13 for the lower edge of bell 11. Outside of water tank 12 and separated therefrom by an annular overflow chamber is a casing 14 which serves as a support for bell 11 and carries off the overflow of water from water seal 13 into a drainage pipe 15. Centrally positioned within bell 11, but spaced therefrom, is a cylindrical well or basin 16 serving as a splash basin for water entering the top of the bell through inlet 17, through which the mixture of gas and water is admitted to bell 11. The gas under test may be taken from a gas main 18 through a mineral wool filter 20 and a glass sight tube 21 to an aspirator 22, through which water is passed from a water supply pipe 23. The mixture of water and gas comes down through inlet pipe 17 into gas bell 11, the gas filling up the bell and forcing the water downward between bell 11 and splash basin 16 until it attains the level indicated in the drawings, where it serves not only as a water seal, but also to maintain an appreciable and constant hydrostatic pressure on the gas within the bell. The water which comes in with the gas through inlet pipe 17 overflows and passes out to replenish water seal 13, the excess water overflowing and passing off through drain 15. The quantity of gas supplied to bell 11 is normally in excess of that drawn off through outlet 10, this excess escaping around the bottom of the bell which is notched to facilitate its passage. Under these conditions a constant water height is maintained on the gas in the bell irrespective of variations in the gas pressure at main 18 and independent of the conditions of filter 20 or of the water pressure at pipe 23.

The means for supplying air to the combustion chamber comprises a pipe 24 leading thereinto in proximity to the burner tube, the air being distributed in an annular column around the burner jet to insure complete combustion. This tube 24 is connected through a rubber pipe 25 with an air supply bell 26, similar in detail to that of the gas supply means and having a water tank 27 forming a water seal 28 and an outer casing 29 for the overflow with a splash basin 30 to receive the incoming water, and notches in the lower edge of the air bell to let the excess air escape through the water seal and maintain a constant water height on the air within the bell. In addition, there is provided a baffle 31 over the air outlet 32 so that splashing water may not enter the outlet with the air.

The inlet tube 33 of the air bell receives its air from the atmosphere through a filter 34, and receives its water through the aspirator 35 from the water supply main 23, which supplies the gas bell. The water for the aspirators can with advantage be of substantially constant temperature, such as deep well water, for in passing down from the aspirators to the bells, it so commingles with the gas and with the air, that it brings them to substantially its own temperature.

Before putting the apparatus in service on a gas of unknown calorific value, a gas of known calorific value is passed through the apparatus and the temperature indication of the thermometer is reduced to B. T. U. in the gas, or whatever unit seems desirable, and the apparatus thereby calibrated and standardized for operation on a gas to be tested.

When the apparatus is in normal operation, with excess gas passing under the edge of the gas bell, and excess air passing under the edge of the air bell, and with the water from the aspirators replenishing the water seals to keep them always at constant height, the volume of gas delivered through the orifice 8 of the gas baffle at the burner tube will bear a definite ratio to the volume of air supplied to the combustion chamber for effecting complete combustion and absorption of the heat. This ratio need not be determined but it should remain constant, and it will remain constant so long as the gas and the air continue to bubble out from under their respective bells. Changes in atmospheric conditions, as indicated by changes in barometric pressure, are without substantial effect on the results of the calorific determination, for the combustion chamber communicates freely with the outer air, and is not subject to variations in internal pressure, and the back pressure on the burner is atmospheric pressure. Inasmuch as the water columns of the gas and air bells are exposed to atmospheric pressure, any change in atmospheric pressure at the combustion chamber will be compensated for by corresponding changes at the gas and air bells.

The apparatus above described has proved particularly valuable as giving practically instantaneous determinations and a permanent record of the calorific value of producer gas used for heating spelter furnaces, and for this purpose has eliminated much expensive gas analysis, and while the determinations of the apparatus are not given directly in absolute units, the calibration of the apparatus on a gas of known characteristics adequately calibrates the apparatus, so that within the range of commercial practice the calorific determinations are reliable. Aside, however, from any accuracy of calibration, the apparatus offers the great advantage of giving a quick indication of any change in the calorific value of a gas under test, whatever that calorific value may be in absolute units, thereby indicating irregularity in the source of supply, which might need correction at the source or for which adequate allowance may be made at the point of gas consumption, as, for instance, in the spelter furnaces.

I claim:

1. In a continuous gas calorimeter, the combination of a combustion chamber opening freely into the atmosphere, a gas tank and an air tank, means for maintaining the gas and air under pressures having a constant ratio, means for delivering gas and air from said tanks to said combustion chamber in constant relative rates of flow for maintaining combustion therein and a thermometer for indicating the temperature in said combustion chamber.

2. In a continuous gas calorimeter, the combination of a combustion chamber opening freely into the atmosphere, a gas tank and an air tank, means for maintaining gas and air under hydrostatic heads having a constant ratio, said hydrostatic heads being exposed to atmospheric pressure, means for delivering gas and air from said tanks to said combustion chamber in constant relative rates of flow for maintaining combustion therein, and a thermometer for indicating the temperature in said combustion chamber.

3. In a calorimeter for continuously indicating and recording the calorific value of a gas, the combination of a combustion chamber, an indicating and recording thermometer having its sensitive element positioned to indicate temperature variations in said combustion chamber, means for supplying gas and air under hydrostatic heads to said combustion chamber for maintaining combustion therein, said heads having a constant ratio one to another and being exposed to atmospheric pressure; substantially as described.

4. In a continuous gas calorimeter, the combination of a combustion chamber opening freely into the atmosphere, a thermometer positioned to indicate temperature changes therein, means for supplying gas to said chamber for combustion therein, means for supplying air to said combustion chamber to oxidize the gas and absorb heat from the products of combustion, said gas and air being supplied by means having hydrostatic heads of constant ratio one to the other; said hydrostatic heads being exposed to atmospheric pressure and thereby compensating for any change in barometric pressure at the combustion chamber substantially as described.

5. In a calorimeter for indicating and recording continuously the calorific value of a gas, the combination of a combustion chamber opening freely into the atmosphere, an indicating and recording thermometer having its sensitive element positioned to indicate the temperature in said combustion chamber, means for continuously supplying gas and an excess of air to said combustion chamber for maintaining combustion therein, said supply means comprising a pair of tanks, one for gas and the other for air, with means for maintaining the contents of said tanks under the pressures respectively of water columns of constant height each of which is exposed to the atmosphere.

6. In a calorimeter for continuously indicating and recording the calorific value of a gas, the combination of a combustion chamber, an indicating and recording calorimeter having its sensitive element in said combustion chamber, means for supplying gas to said combustion chamber for ignition therein, means for supplying air to said combustion chamber in large excess of that required for complete combustion of the gas supplied thereto, said gas supplying means and said air supplying means each comprising a bell surrounded by a water seal of constant height, water aspirators delivering gas and air to said bells respectively, and means for conveying to said combustion chamber a part only of the gas delivered to said bells, the remainder being allowed to escape under the edge of said bells, said aspirators also delivering water to said bells for continuously maintaining their water seals.

7. In a calorimeter for continuously indicating and recording the calorific value of a gas, the combination of a combustion chamber opening freely into the atmosphere, an indicating and recording thermometer having its sensitive element in said combustion chamber, means for supplying gas to said combustion chamber, means for supplying air to said combustion chamber in excess of that required for combustion of the gas, the relative volumes of gas and air thus supplied being at constant ratio, said gas and air supplying means each comprising a bell surrounded by a water seal of constant head and each comprising a water aspirator for delivering the gaseous fluid to the bell in excess of the requirement of the combustion chamber, and simultaneously replenishing the water seal, the water for said aspirators being supplied from a common source and at approximately constant temperature.

8. In a calorimeter for continuously recording the calorific value of a gas, the combination of a combustion chamber freely open to the atmosphere, a dead air space around said combustion chamber, and a lagging for heat insulation outside of said dead air space, a recording thermometer having its sensitive element in said combustion chamber, means for supplying gas and air to said combustion chamber at constant ratio, said gas supplying means comprising a burner tube with a glass gas baffle just back of said tube where the heat of the flame can not impair its effectiveness; substantially as described.

9. In a gas calorimeter of the character described, the combination of a combustion chamber, means for supplying gas thereto for combustion, means for supplying air thereto to support combustion and absorb the heat, the volumes of the gas and air thus supplied bearing constant ratio one to the other, said gas supplying means and said air supplying means each comprising a stationary bell with a water seal of constant height, and an aspirator for each of said bells delivering the gaseous fluid thereto in excess of the amount supplied to said combustion chamber, said excess being allowed to escape under the edge of the bells through their respective water seals.

10. In a continuous gas calorimeter, the combination of a combustion chamber, means for delivering gas and air thereto under regulated pressure for combustion therein and in volumes having a constant ratio, said means including a gas bell having a water seal, and means for delivering water and gas to said bell, the gas thus supplied being sufficient to maintain the water seal at a constant level.

11. In a continuous gas calorimeter of the character described, having means for supplying gas and air thereto in volumes of constant ratio, the combination of a stationary gas bell having notches in its lower edge, a water seal around said bell, an inlet in the top of said bell and an outlet therefrom, a water aspirator delivering gas to said bell faster than it leaves said outlet, the excess escaping through the notches in the bell and the water entering with the gas serving to replenish the water seal to maintain a constant pressure head on the gas in the bell.

12. The method of obtaining a continuous indication of the calorific value of a combustible gas on burning in an excess of air, which consists in bringing the gas and air to substantially the same temperature and maintaining a supply of said gas and air under hydrostatic columns which bear a constant ratio one to another, supplying said gas and air to a combustion chamber in constant ratio and there completely burning said gas and measuring the temperature in said combustion chamber said combustion chamber and said hydrostatic columns being open to atmospheric pressure.

13. The method of obtaining a continuous record of the calorific value of a combustible gas when burned in air, which consists in bringing said gas and air to uniform temperature by intimate commingling with water from a common source, storing said gas and air under pressure, supplying said gas and air to a combustion chamber in constant ratio and burning said gas in said air, and continuously recording the temperature resulting from said combustion, substantially as described.

14. The method of obtaining a continuous indication of the calorific value of a combustible gas when burned in an excess of air, which consists in bringing said gas and air to substantially constant and equal temperatures by intimately commingling said gas and air with water from a common source of substantially constant temperature, storing said gas and air under hydrostatic heads which remain at substantially constant ratio one to the other, and are exposed to atmospheric pressure, delivering said stored gas and air to a combustion chamber in constant relative proportions, and burning said gas in said air and securing a continuous indication of the calorific value of the gas through continuous measurements of the temperature resulting from said combustion, substantially as described.

In testimony whereof I affix my signature, in presence of two witnesses.

FRANK GOTTLOB BREYER.

Witnesses:
Philip M. Ginder,
Herbert B. Snyder.